US007129988B2

(12) United States Patent
Wang et al.

(10) Patent No.: US 7,129,988 B2
(45) Date of Patent: Oct. 31, 2006

(54) ADAPTIVE MEDIAN FILTERS FOR DE-INTERLACING

(75) Inventors: Yiwei Wang, San Jose, CA (US); Siyun Li, San Jose, CA (US)

(73) Assignee: ChronTel, Inc., San Jose, CA (US)

( * ) Notice: Subject to any disclaimer, the term of this patent is extended or adjusted under 35 U.S.C. 154(b) by 415 days.

(21) Appl. No.: 10/374,198

(22) Filed: Feb. 25, 2003

(65) Prior Publication Data

US 2003/0160895 A1 Aug. 28, 2003

Related U.S. Application Data

(60) Provisional application No. 60/359,871, filed on Feb. 25, 2002.

(51) Int. Cl.
*H04N 7/01* (2006.01)
*G06K 9/40* (2006.01)

(52) U.S. Cl. ....................... 348/448; 348/450; 382/262

(58) Field of Classification Search ........ 348/448–452; 382/260–261, 262; *H04N 7/01*
See application file for complete search history.

(56) References Cited

U.S. PATENT DOCUMENTS 4,941,045 A * 7/1990 Birch ......................... 348/448
5,134,480 A 7/1992 Wang et al.
5,483,288 A * 1/1996 Hong ......................... 348/448
5,532,750 A * 7/1996 De Haan et al. ............ 348/452
5,657,402 A 8/1997 Bender et al.
5,742,348 A * 4/1998 Kuwahara et al. .......... 348/441
5,748,250 A * 5/1998 Markandey et al. ........ 348/451
5,920,657 A 7/1999 Bender et al.
6,034,734 A 3/2000 De Haan et al.
6,262,773 B1 * 7/2001 Westerman ................. 348/448
6,269,484 B1 7/2001 Simsic et al.
6,281,942 B1 * 8/2001 Wang ......................... 348/607
6,295,091 B1 * 9/2001 Huang ........................ 348/448
6,340,990 B1 1/2002 Wilson
6,414,719 B1 7/2002 Parikh
6,700,623 B1 * 3/2004 Weston et al. .............. 348/448
6,754,371 B1 * 6/2004 Kondo et al. ............... 382/107
6,788,353 B1 * 9/2004 Wredenhagen et al. ..... 348/581
6,822,691 B1 * 11/2004 Kim et al. .................. 348/452
6,898,328 B1 * 5/2005 Carrig et al. ............... 382/261
6,914,638 B1 * 7/2005 Tsui ........................... 348/663
6,940,557 B1 * 9/2005 Handjojo et al. ........... 348/452
2002/0080269 A1 * 6/2002 Gotanda et al. ............ 348/448
2005/0179814 A1 * 8/2005 Pau et al. ................... 348/448
2005/0206785 A1 * 9/2005 Swan et al. ................. 348/448

* cited by examiner

*Primary Examiner*—Brian P. Yenke
(74) *Attorney, Agent, or Firm*—Perkins Coie LLP

(57) ABSTRACT

An adaptive intra-field algorithm to de-interlace video data uses two line memories to implement a median filter that can use multiple data points on adjacent lines of display. In a median-mode, the filter outputs the median of the input data to create the value for a location on the intermediate line and can decrease image blurring. But if examination of the two adjacent pixels on two adjacent scan lines is small, as in the case of a vertical image line, the filter operates as a line average filter, to avoid creating image artifacts.

10 Claims, 5 Drawing Sheets

ADAPTIVE MEDIAN FILTERS FOR DE-INTERLACING

This application claims the benefit of provisional application No. 60/359,871 filed on Feb. 25, 2003.

FIELD OF THE INVENTION

The invention relates generally to converting interlace-type video data, and more specifically to methods and devices to de-interlace such video data adaptively to reduce blurring without producing image artifacts.

BACKGROUND OF THE INVENTION

A video sequence is a series of still images. Transmitting or storing a video sequence involves use of a certain scan format to convert video sequence data into pixels. Two such scan formats are commonly used: interlaced and non-interlaced.

As shown in FIG. 1A, devices using interlaced format will first scan the odd-numbered image lines to construct a first image field, and then scan the even-numbered image lines to construct the second field. On the other hand, as shown in FIG. 1B, devices using non-interlaced format simply scan an image line-by-line to construct a frame. Television technology started with interlaced scan but more recently, thanks to advances in technology, many television sets can display non-interlaced video.

But as most video sources are still in interlaced format, so-called de-interlacing algorithms are needed. Generally speaking, a noninterlaced frame has N scan lines while an interlaced field has N/2 scan lines (every other noninterlaced scan line). Hence, a de-interlacing algorithm needs to fill in the missing scan lines based on the existing data.

De-interlacing algorithms can be classified into two categories: intra-field algorithms and inter-field algorithms. Intra-field algorithms use only the information in the current field, while inter-field algorithms explore the data in adjacent fields as well.

The simplest intra-field de-interlacing algorithm simply repeats the previous active scan line, a straightforward technique that unfortunately produces an image having poor visual quality. A better intra-field algorithm is so-called scan line interpolation, an example of which uses line averaging:

$$\text{Line}_n = 0.5\cdot(\text{Line}_{n-1} + \text{Line}_{n+1})$$

Referring to FIG. 1C, data for pixel a in line 1 is added to data for pixel b in line 2 and then averaged to a value for pixel x at intermediate line 1.5. Line averaging requires line memories and is thus more expensive to implement than the simple technique of repeating a line. Better results can be obtained if additional scan lines are used in scan line interpolation, but understandably even more line memory will be required, and implementation expenses will increase accordingly.

As noted, inter-field algorithms use not only information from the current field, but also use information from other fields, to produce generally superior viewing results. But implementing inter-field algorithms requires frame buffers, which can increase the complexity and the cost drastically. For this reason, inter-field algorithms are not commonly used in low-end devices.

What is needed is a de-interlacing algorithm that can provide better viewing quality close to inter-field algorithms, but at a complexity and cost level that is commensurate with simpler scan line interpolation techniques.

The present invention provides such an algorithm, and adaptive filters for implementing the algorithm.

SUMMARY OF THE INVENTION

The present invention provides an intra-field algorithm that uses two line memories. Rather than simply average between two lines as in the prior art, in a median-mode the present invention utilizes a median filter that uses three pixels in each of the two adjacent scan lines. The filter outputs the median of the input data to create the value for a pixel on the intermediate line, and can decrease blurring in the output image. To avoid image degradation when a thin vertical line is present, use of a median filter is adaptive. Thus, if examination of two adjacent pixels on two adjacent scan lines shows the difference to be large, median-mode filtering is used. But if the two pixel values are close, then common line averaging mode filtering is used.

Other features and advantages of the invention will appear from the following description in which the preferred embodiments have been set forth in detail, in conjunction with the accompanying drawings.

DETAILED DESCRIPTION OF THE PREFERRED EMBODIMENTS

As noted, a de-interlacing algorithm for use with inexpensive low-end devices should be straightforward and relatively inexpensive to implement. Thus, the present invention provides an intra-field algorithm that uses two line memories, but augments quality of the resultant image by using a median filter that operates upon three points in each of two lines to arrive at a value for a point in an intermediate line. While slightly more complicated to implement than simple line average, resultant image quality is enhanced, yet no additional line memories are required.

Figure 1A:
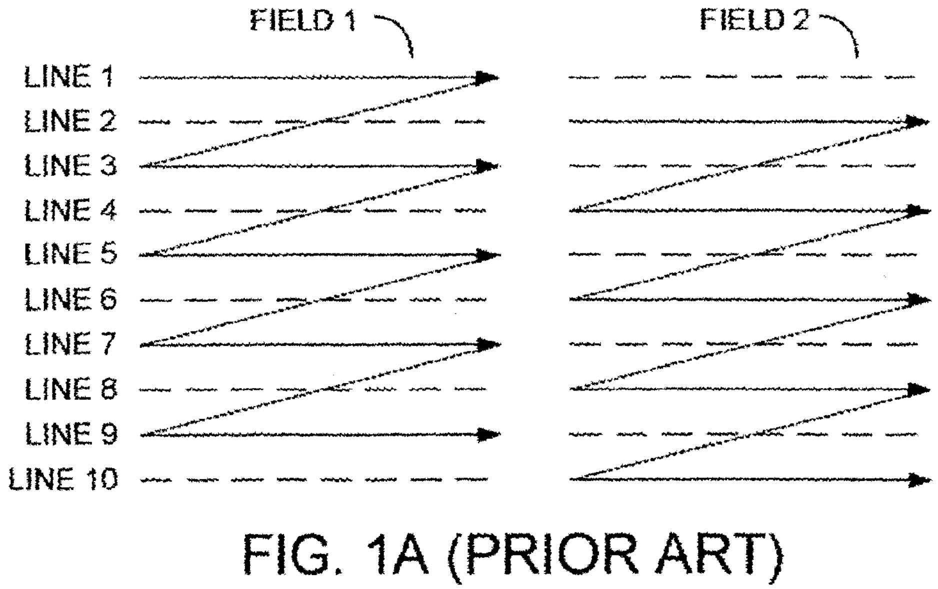
FIG. 1A depicts interlaced scan format, according to the prior art.
Figure 1B:
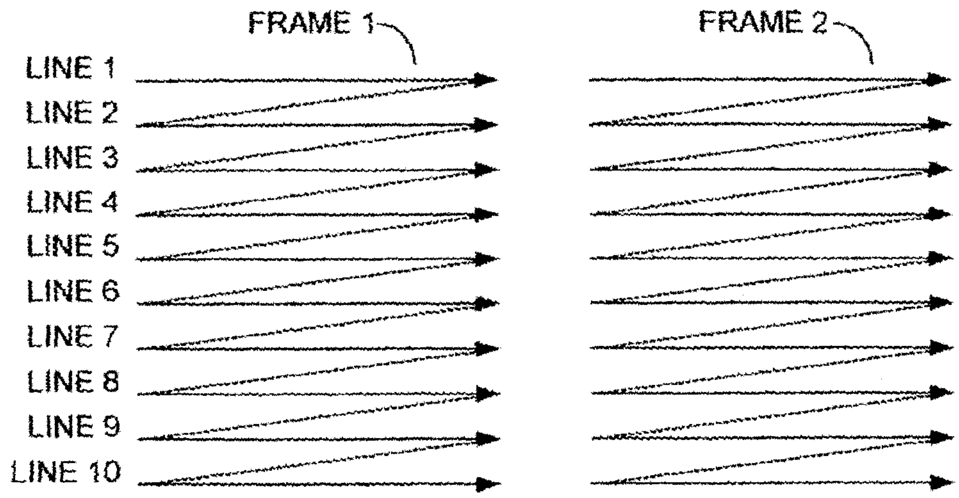
FIG. 1B depicts non-interlaced scan format, according to the prior art.
Figure 1C:
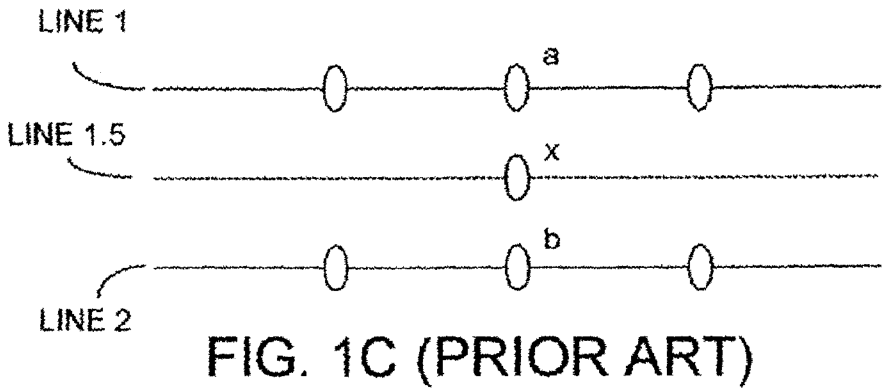
FIG. 1C depicts simple line averaging, according to the prior art.
Figure 2:
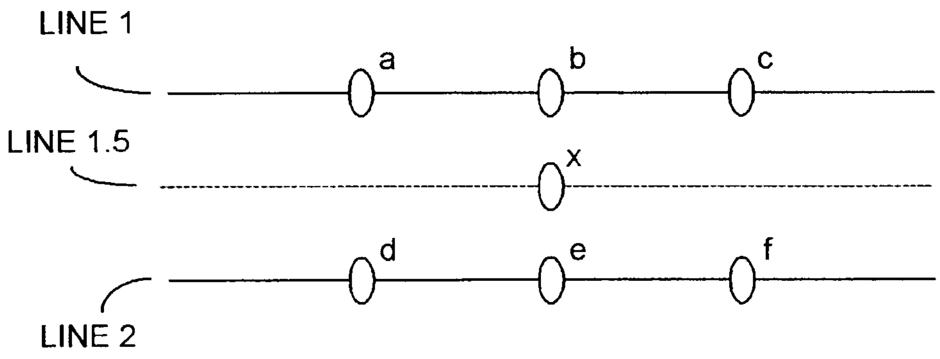
FIG. 2 depicts two line median filter averaging, according to the present invention.

FIG. 2 depicts a first line with locations a, b, c, and second line with locations d, e, and f, and an intermediate line (denoted line 1.5) with a location x. According to the present invention, the data for location x is arrived at by using a median filter that examines the six points a, b, c, d, e, and f. The output of the median filter is the median value of (a, b, c, d, e, f). It is understood that "median" denotes the middle of a distribution in that half the data values in the distribution are higher than the median, and half are lower than the median. For example, the median of (1, 3, 6, 7, 8) is 6, and the median of (1, 3, 6, 7, 8, 9) is 6.5. Thus in FIG. 2, the value of x is the median of (a, b, c, d, e, f).

While arriving at the median value, one line memory is used to hold line 1 data for a, b, c, and a second line memory is used to hold line 2 data for d, e, f. Thus, it suffices if only two line memories are used. In implementing the present invention, a mechanism will sort out the six data values (a, b, c, d, e, f) and a mechanism will be used to average between two values. Sorting and averaging steps enable the present invention to compute the median, given six data values.

Figure 3A:
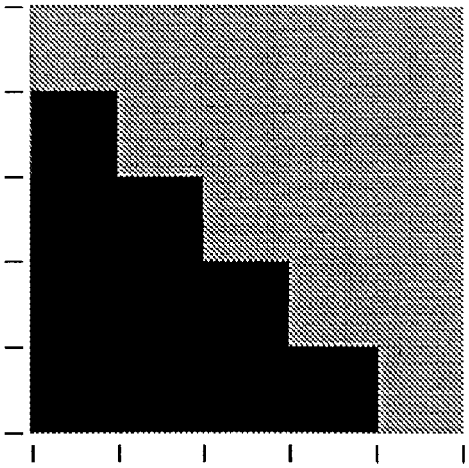
FIG. 3A depicts an exemplary pre-interlaced 5×5 pixel display, according to the present invention.
Figure 3B:
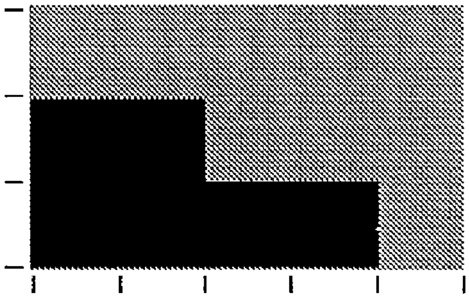
FIG. 3B depicts post-interlaced data for a first field for the display of FIG. 3A, according to the present invention.
Figure 3C:
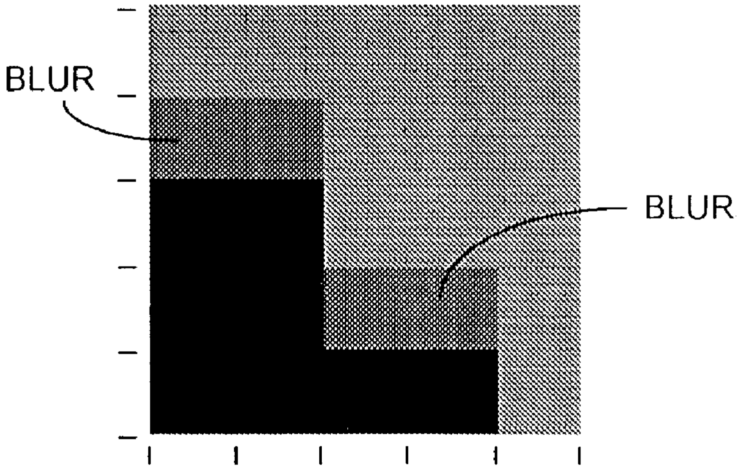
FIG. 3C depicts simple-averaged de-interlaced data from the field shown in FIG. 3B with edge blurring, according to the prior art.

Advantageously, the present invention's use of median filtering can decrease blurring in some instances. Consider the 5×5 pre-interlace display pattern shown in FIG. 3A. After interlace, data for the first field of the pattern is as shown in FIG. 3B. Using prior art simple average de-interlacing techniques, the de-interlaced data from the first field would be as shown in FIG. 3C. Note the two regions of blurring.

Figure 3D:
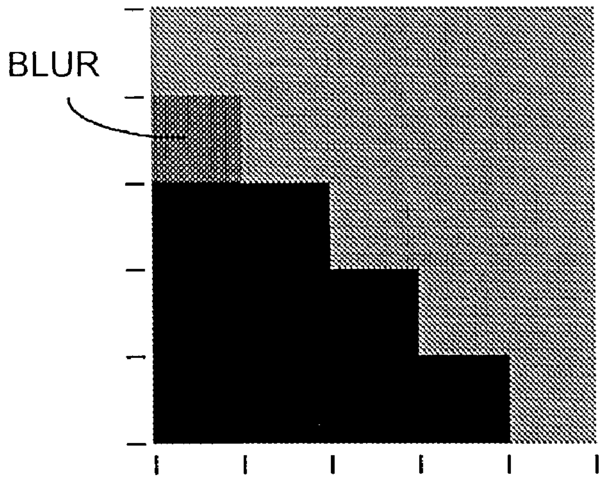
FIG. 3D depicts data de-interlaced from the field shown in FIG. 3B using simple median filtering, according to the present invention.

Consider now the display shown in FIG. 3D, which represents data de-interlaced for the same field shown in FIG. 3B, using a median filter, according to the present invention, in which boundaries are determined using four point median filtering. Comparing the pattern shown in FIG. 3D produced by the present invention with the pattern shown in FIG. 3C, produced according to the prior art, it is seen that median filtering produces less blurring.

Figure 3E:
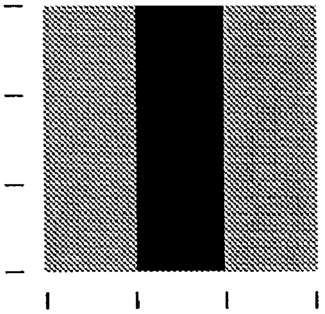
FIG. 3E depicts an exemplary 3×3 field containing a vertical line, according to the prior art.
Figure 3F:
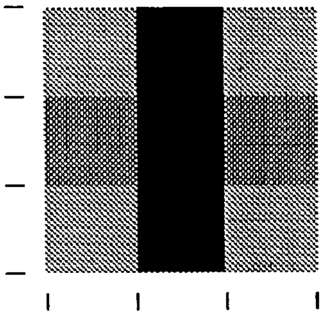
FIG. 3F depicts de-interlacing of the field shown in FIG. 3E using median filtering, according to the present invention.

But in some instances, median filtering can produce artifacts, an undesired outcome, especially given the cost of implementing median filtering over straight line averaging. Consider the 3×3 pattern shown in FIG. 3E. If de-interlacing is carried out using simple line averaging according to the prior art, the same pattern will be recovered. It is understood in FIG. 3E that adjacent pixels on adjacent scan lines (e.g., pixels spaced-apart vertically) will have similar values. But if de-interlacing is carried out on the pattern shown in FIG. 3E using median filtering, the result will be as shown in FIG. 3F, an image that shows undesired artifacts.

Thus while a relatively simple median filter can provide advantageous results under some circumstances, a simple median filter may have difficulty in recovering an acceptable image where a vertical line (or the equivalent) is present. The present invention addresses this problem by providing adaptive median filtering. By adaptive filter it is meant that de-interlace filtering can be simple line averaging when the image at hand would benefit from such filtering, or advantageously can be median filtering, when the image at hand would benefit from median filtering.

Thus, in a preferred embodiment, a decision is made whether to use simple filtering or to use median filtering based upon the values of two adjacent pixels in adjacent scan lines. For example, in FIG. 2, pixel b on line 1 and pixel e on line 2 are adjacent to pixel x on line 1.5. If the values of pixels b and e are sufficiently close, the present invention will use a simple average line filter to arrive at a value for pixel x on line 1.5.

The relative closeness of pixel values such as pixels b and e in the above example preferably is determined using an algorithm. Such algorithm is based on the assumption that pixel values of a homogenous object are nearly identical. The actual threshold of "sufficiently close" depends on the video data being processed and is generally about 10% of the full range of the pixel value. In the preferred embodiment, the threshold is user adjustable via software.

The rationale for so doing is that when the value of adjacent pixels b, and e are sufficiently close, the likelihood of pixel x being in a relatively uniform region or belonging to a vertical texture region is extremely high. As is apparent from FIGS. 3E and 3F, to determine a value for pixel x using a median filter is disadvantageous under these circumstances. On the other hand, if the values for pixels b and e are not sufficiently close, the present invention will use median filtering to determine the value for pixel x on intermediate line 1.5, thus obtaining the benefit of less blurring (as was shown by FIG. 3D). In this manner, the present invention can adaptively provide de-interlace median filtering that reduces blurring while avoiding generation of artifacts in images containing vertical lines (or the like).

Use of a median filter with even number (e.g., 2, 4, . . . ) taps can be broken down into two steps for monochrome data: sorting and averaging. For color data, although each channel could be separately processed, it is more efficient to use a single channel during sorting to select the middle two pixels, and then to perform averaging on the pixels for all channels. This procedure can avoid color distortion problems if the sorting process returns different pixel sets from different channels.

In many practical applications, color data that contains a luma component and two chroma components will be present. Preferably the two chroma components are down-sampled and multiplexed onto the same channel. The luma channel may be used for the sorting step, and the averaging step can be performed for all three components. However it can be important to ensure that the chroma data are selected properly.

Figure 4:
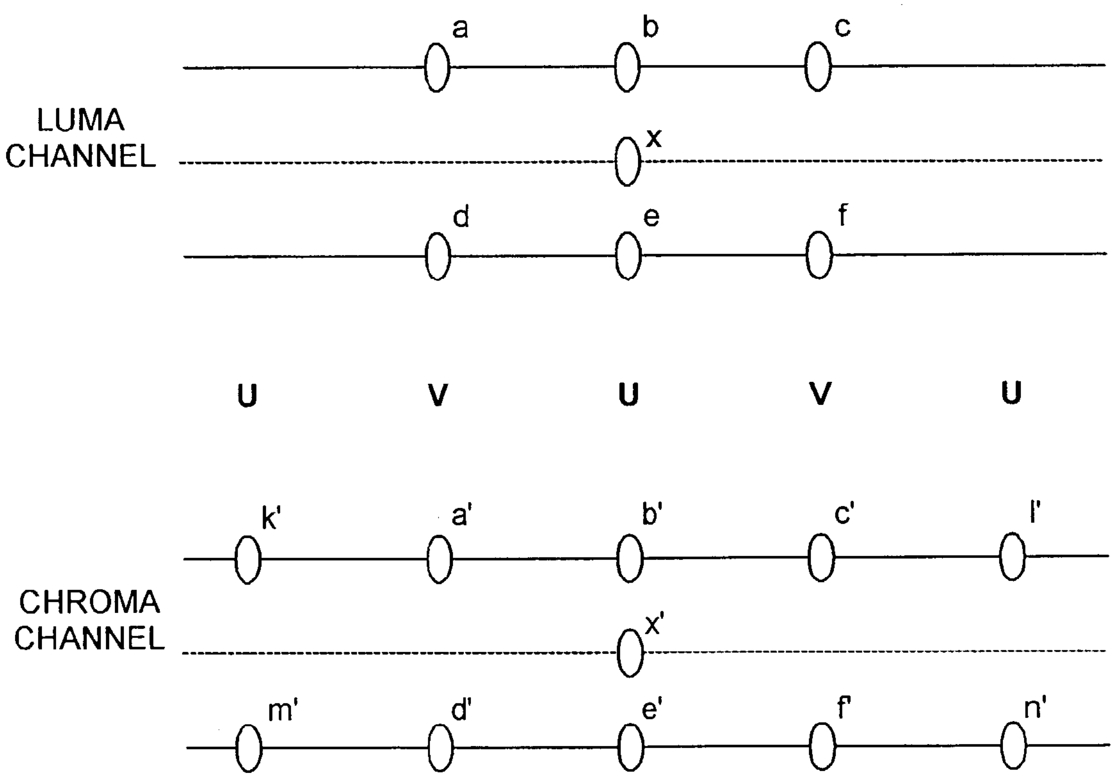
FIG. 4 depicts use of median filtering to de-interlace color data containing a luma channel and two chroma channels, according to the present invention.

FIG. 4 depicts an example of such processing considerations. The two chroma components are labeled U and V and are multiplexed onto the same channel. Assume that pixel x is the pixel of interest, and assume that the difference in values between adjacent pixel b (line 1) and pixel e (line 2) is relatively large. Assume also that pixels c and d represent the middle two values of pixels a, b, c, d, e, and f in the luma channel. Under these assumptions, for the luma channel x should be $0.5 \cdot (c+d)$.

But for the corresponding x' value in the chroma channel in FIG. 4, the average of c' and d' cannot be used as the value x' should be for the U-component,while the values for c' and d' are for the V-component. The present invention attains the corresponding U-value for x' by using the average of l' and m' values.

Figure 5:
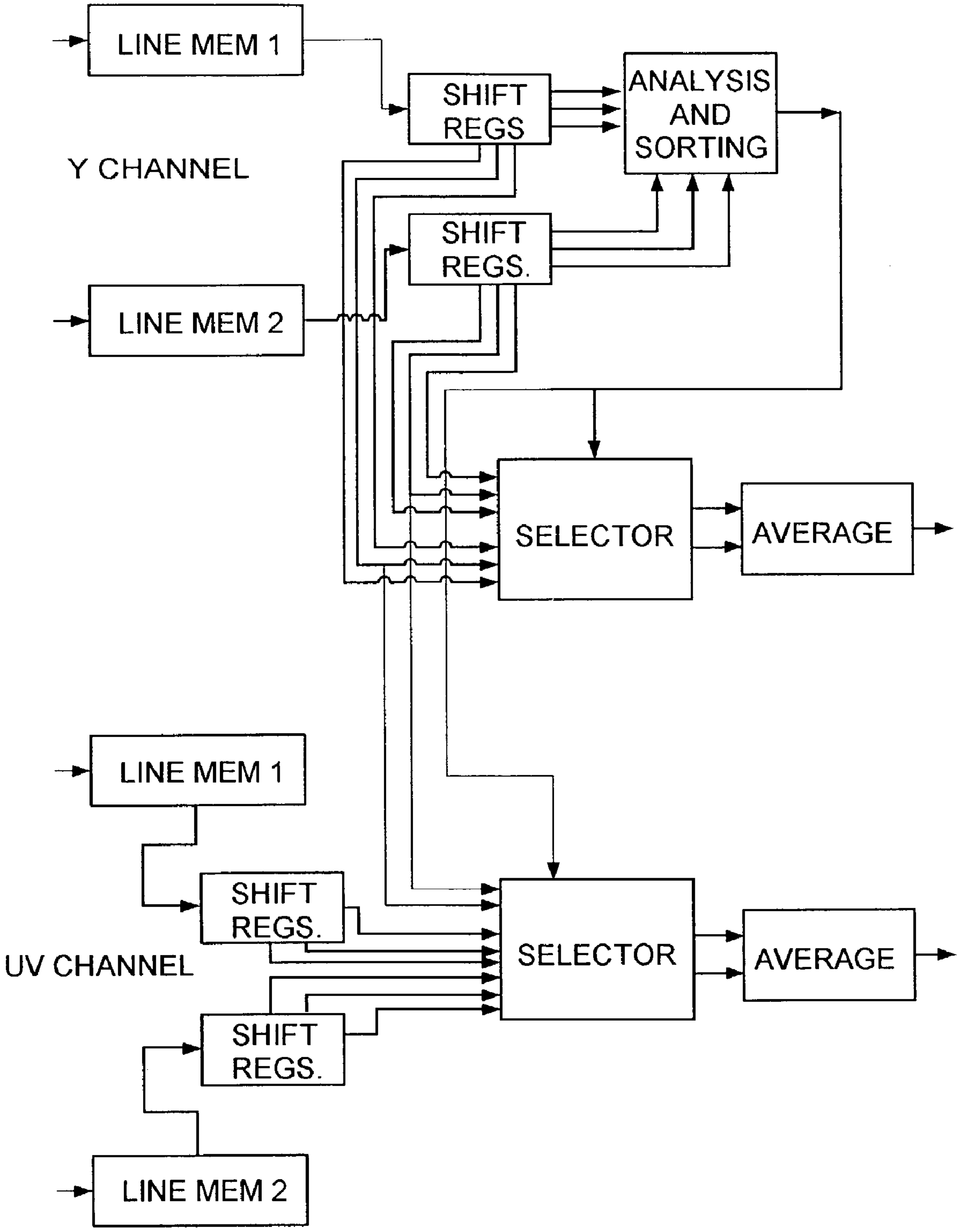
FIG. 5 is a block diagram of an exemplary adaptive median filter for Y, U/V channels, according to the present invention.

FIG. 5 is an exemplary block diagram of a system to implement adaptive median filtering for Y, and U/V channels, according to the present invention. For ease of illustration and explanation, the present invention has been described primarily with respect to two scan lines having three pixels per line. It is understood, however, that the present invention is applicable for use with systems employing more than two scan lines, and/or more than three pixels per line.

Modifications and variations may be made to the disclosed embodiments without departing from the subject and spirit of the invention as defined by the following claims.

What is claimed is:

1. A method to de-interlace interlaced video data that comprises odd and even numbered lines of image data defining respective first and second image fields and said interlaced video data includes a luma channel and first and second chroma channels of data, the method comprising the following steps:

(a) examining at least three pixels values on each line of an adjacent pair of even and odd numbered lines of image data;

(b) generating a median value of the examined pixel values including sorting-by-value each of said pixel values and averaging said pixel values sorted-by-value to obtain said median value, and (i) said sorting-by-value each of said pixel values is carried out on pixel values representing luma channel data, and (ii) said averaging pixel values is carried out on pixel values representing said luma channel data, and said first and second chroma channels of data:

(c) defining a pixel value having said median value determined at step (b) for use on a line intermediate the two lines of image data used at step (a); and (d) down-sampling and multiplexing said first and second chroma channels of data onto a single channel before using said data.

2. The method of claim 1, wherein the number of pixels examined for each of said lines of pixel data is three.

3. The method of claim 1, wherein the number of pixels examined for each of said lines of pixel data is four.

4. The method of claim 1, wherein the step of examining at least three pixels values on each line of an adjacent pair of even and odd numbered lines of image data further includes storing each of said pixel values before they are examined.

5. The method of claim 1, wherein the step of examining at least three pixels values on each line of an adjacent pair of even and odd numbered lines of image data further includes storing in a first line memory pixel values on a first line in said adjacent pair, and storing in a second line memory pixel values on a second line in said adjacent pair.

6. A method to adaptively de-interlace interlaced video data that comprises odd and even numbered lines of image data defining respective first and second image fields, said interlaced video data includes a luma channel and first and second chroma channels of data, the method comprising the following steps:

(a) examining at least one adjacent pixel value on each line of an adjacent pair of even and odd numbered lines of image data;

(b) if the step (a) of examining determines that values of examined said adjacent pixel values are within a pre-determined value of closeness, averaging pixel values on adjacent ones of said odd and even numbered lines to generate an averaged pixel value to use on a line of image data intermediate thereto; and (c) if the step (a) of examining determines that values of examined said pixel values exceed a pre-determined value of closeness, then generating a median pixel value for use on a line of image data intermediate each adjacent pair of lines of image data, the generating including generating a median pixel value for use on a line of image data intermediate each adjacent pair of lines of image data step includes: sorting-by-value each of said pixel values carried out on pixel values representing luma channel data; and averaging sorted pixel values to obtain said median value carried out on pixel values representing said luma channel data, and said first and second chroma channels of data; and (d) down-sampling and multiplexing said first and second chroma channels of data before using said data.

7. The method of claim 6, wherein the step of generating a median pixel value for use on a line of image data intermediate each adjacent pair of lines of image data includes:

(c-1) examining at least three pixels values on one of said odd numbered lines of image data and examining at least three pixel values on an adjacent one of said even numbered lines of image data;

(c-2) generating a median value of the at least six pixel values examined in step (c-1); and (c-3) defining a pixel having said median value determined at step (c-2) for use on a line intermediate the pair of lines of image data used at step (c-1).

8. The method of claim 7, where at step (c-1) the number of pixels examined for each of said lines of image data is three.

9. The method of claim 7, wherein at step (c-1) the number of pixels examined for each of said lines of image data is four.

10. The method of claim 7, wherein step (c-1) the step of examining at least three pixels values on one of said odd numbered lines of image data and examining at least three pixel values on an adjacent one of said even numbered lines of image data includes storing each of said pixel values before they are examined.

* * * * *